United States Patent [19]

Morita

[11] 4,311,648

[45] Jan. 19, 1982

[54] N-(SULFENYL) METHACRYLAMIDES

[75] Inventor: Eiichi Morita, Copley, Ohio

[73] Assignee: Monsanto Company, St. Louis, Mo.

[21] Appl. No.: 148,066

[22] Filed: May 12, 1980

Related U.S. Application Data

[62] Division of Ser. No. 62,265, Jul. 30, 1979.

[51] Int. Cl.$^3$ ............................................. C07C 83/10
[52] U.S. Cl. ........................................... 260/453 RW
[58] Field of Search ................................ 260/453 RW

[56] References Cited

U.S. PATENT DOCUMENTS

| | | | |
|---|---|---|---|
| 3,344,153 | 9/1967 | Kuhle et al. | 260/453 RW |
| 3,546,185 | 12/1970 | Coran et al. | 260/453 RW |
| 3,579,460 | 5/1971 | Kerwood | 260/453 RW |
| 3,679,673 | 7/1972 | Brown | 260/453 RW |
| 3,705,135 | 12/1972 | Wolfinger | 260/453 RW |
| 3,855,262 | 12/1974 | Coran et al | 260/453 RW |

OTHER PUBLICATIONS

Chem. Abs., 74:32743p, 1971.
Trivette, Jr., et al., Rubber Chem. & Tech., vol. 50 pp. 570-600, 1977.

*Primary Examiner*—John M. Ford
*Assistant Examiner*—Robert C. Whittenbaugh
*Attorney, Agent, or Firm*—Larry R. Swaney

[57] ABSTRACT

Vulcanizable rubber compositions are described which are inhibited from premature vulcanization by N-(sulfenyl) methacrylamides.

10 Claims, No Drawings

N-(SULFENYL) METHACRYLAMIDES

This is a division of application Ser. No. 062,265 filed July 30, 1979.

This invention relates to improved vulcanizable rubber compositions inhibited from premature vulcanization by novel N-sulfenyl methacrylamides.

BACKGROUND OF THE INVENTION

The use of N-sulfenyl derivatives of amides to inhibit premature vulcanization of rubber is well-known, for example, see U.S. Pat. No. 3,546,185. However, heretofore N-sulfenyl derivatives of amides containing olefinic unsaturation have not been described.

SUMMARY OF THE INVENTION

It has now been discovered that N-sulfenyl derivatives of methacrylamide are especially potent premature vulcanization inhibitors. Vulcanizable compositions of the invention comprise sulfur-vulcanizable rubber, sulfur-vulcanizing agent, organic vulcanization accelerating agent and, in an amount effective to inhibit premature vulcanization, a compound of the formula

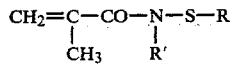

in which R and R' are the same or different radicals selected from the group consisting of primary or secondary alkyl of 1-20 carbon atoms, benzyl, cycloalkyl of 5-12 carbon atoms, phenyl or mono-, di-, or tri-substituted phenyl wherein the substituents are lower alkyl, lower alkoxy or halo, or R' is —SR. Compounds in which R is cycloalkyl of 5-8 carbon atoms or secondary alkyl of 3-8 carbon atoms and R' is phenyl are preferred.

Examples of satisfactory radicals for R and R' are methyl, ethyl, propyl, isopropyl, n-butyl, sec. butyl, isobutyl, pentyl, sec. pentyl (1-methylbutyl), hexyl, heptyl, octyl, nonyl, decyl, dodecyl, eicosyl, cyclopentyl, cyclohexyl, 2-methylcyclohexyl, 4-methylcyclohexyl, cycloheptyl, cyclooctyl, cyclodecyl, cyclododecyl, phenyl, 2-methylphenyl, 3-methylphenyl, 4-methylphenyl, 2-methyl-4-t-butylphenyl, 4-t-butylphenyl, 2,4,6-trimethylphenyl, 3-isopropylphenyl, 4-methoxyphenyl, 4-ethoxyphenyl, 4-chlorophenyl and 2,4-dichlorophenyl. Hydrocarbon radicals are preferred. Preferred alkyl radicals are lower alkyl radicals of 1-5 carbon atoms.

Examples of novel compounds of the invention are:
N-Methylthio-N-phenyl-methacrylamide,
N-Ethylthio-N-phenyl-methacrylamide,
N-Propylthio-N-phenyl-methacrylamide,
N-Butylthio-N-phenyl-methacrylamide,
N-Isobutylthio-N-phenyl-methacrylamide,
N-sec.Butylthio-N-phenyl-methacrylamide,
N-Pentylthio-N-phenyl-methacrylamide,
N-Hexylthio-N-phenyl-methacrylamide,
N-Octylthio-N-phenyl-methacrylamide,
N-Decylthio-N-phenyl-methacrylamide,
N-Cyclopentylthio-N-phenyl-methacrylamide,
N-Cyclooctylthio-N-phenyl-methacrylamide,
N-Benzylthio-N-phenyl-methacrylamide,
N-2,6-Dimethylphenylthio-N-phenyl-methacrylamide,
N,N-Di(methylthio)methacrylamide,
N,N-Di(ethylthio)methacrylamide,
N,N-Di(isopropylthio)methacrylamide,
N,N-Di(butylthio)methacrylamide,
N,N-Di(cyclopentylthio)methacrylamide,
N,N-Di(cyclohexylthio)methacrylamide,
N,N-Di(cyclooctylthio)methacrylamide,
N,N-Di(benzylthio)methacrylamide.

The inhibitors of the invention are incorporated into rubber stocks by mixing on a mill or in an internal mixer such as a Banbury mixer. However, the inhibitors may be incorporated by addition to latex, if desired. The process of the invention is particularly applicable to sulfur-vulcanizable rubber compositions which rubber compositions contain a sulfur vulcanizing agent such as an amine disulfide or a polymeric polysulfide but preferably, the vulcanizing agent is elemental sulfur. Rubber compositions containing organic accelerating agents are particularly improved by the inhibitors of the invention with compositions containing benzothiazole sulfenamide accelerators being preferred. Any organic accelerating agent in an amount effective (generally about 0.1-5 parts by weight accelerator per 100 parts by weight rubber) to accelerate the sulfur vulcanization of rubber is satisfactory in the practice of this invention. Examples of suitable accelerators are described in U.S. Pat. No. 3,546,185, Col. 9, lines 53-75, and in U.S. Pat. No. 3,780,001, Col. 4, lines 43-72. The inhibitors of the invention are effective with any sulfurvulcanizable natural and synthetic rubber and mixtures thereof and especially effective with diene rubbers. Examples of satisfactory rubbers are described in U.S. Pat. No. 3,546,185, Col. 10, lines 15-21 and U.S. Pat. No. 3,780,001, Col. 5, lines 5-33. The vulcanizable composition may also contain conventional compounding ingredients such as reinforcing pigments, extenders, processing oils, antidegradants, and the like.

Small amounts of inhibitors are effective to inhibit premature vulcanization. Improvements in processing safety may be observed with 0.05 parts or less of inhibitor per 100 parts rubber. Although there is no upper limit in the amount of inhibitor used, generally the amount does not exceed 5 parts inhibitor per 100 parts rubber. Typically, the amount of inhibitor added is about 0.1 to 2.5 parts per 100 parts rubber with amounts of about 0.2 to 1 part inhibitor per 100 parts rubber being commonly used. Methods for determining scorch times and curing characteristics of rubber stocks used in illustrating this invention are described in U.S. Pat. No. 3,546,185, Col. 13, lines 30-53. Stress-strain properties are reported in Mega Pascals (MPa).

The compounds of the invention are valuable intermediates for the preparation of other compounds or polymers. The olefinic unsaturation provides a reactive site suitable for polymerization or addition reactions. For example, compounds of the invention are useful in preparing modified polymethacrylate. Polymerization of methyl methacrylate in the presence of minor amounts (1-10 Wt. %) of compounds of the invention gives methacrylate polymer having pendant N-(sulfenyl)amide groups. The resulting N-(sulfenyl)amide-modified polymethacrylate are useful as non-blooming premature vulcanization inhibitors.

DESCRIPTION OF THE PREFERRED EMBODIMENTS

Compounds of the invention are prepared by reacting a sulfenyl chloride with methacrylamide or N-substituted methacrylamide in the presence of a hydrogen chloride acceptor. Alternatively, a sulfenyl chloride is reacted with an alkali metal salt of methacrylamide or N-substituted methacrylamide. The alkali metal salts may be prepared by reacting alkali metal alkoxide, methacrylate ester and amine followed by removal of the alcohol by-product by distillation.

EXAMPLE 1

To a stirred slurry of methacrylamide (8.5 g, 0.1 m), triethylamine (22.2 g, 0.22 m) and 150 ml of methylene chloride, there is added at 4° C. over a one hour period, a solution of benzene sulfenyl chloride (0.2 m). The amine salt by-product is removed by filtration and the solvent is stripped from the filtrate by vacuum distillation. Ether is added to the residue, washed with water, dried, filtered, and vacuum distilled to yield a solid product. The solid product is washed with ethanol and dried. N,N-Di(phenylthio)methacrylamide, m.p. 71° C. recrystallized from ethanol, is recovered. Chemical analysis gives 20.44% sulfur compared to 21.27% sulfur calculated for $C_{16}H_{15}NOS_2$.

EXAMPLE 2

A solution of benzene sulfenyl chloride (0.2 m) in methylene chloride is added slowly at 5°–10° C. to a slurry of N-phenyl-methacrylamide (32.2 g, 0.2 m), triethylamine (22.2 g, 0.22 m), and 150 ml of methylene chloride. Amine salt by-product is recovered by filtration. The filtrate was washed three times with water, dried and the solvent removed by vacuum distillation at 30° C. The residue is washed with ethanol, filtered and dried. N-phenyl-N-phenylthio-methacrylamide, m.p. 80°–81° C. recrystallized from hexane, is recovered. Chemical analysis gives 11.02% sulfur compared to 11.91% sulfur calculated for $C_{16}H_{15}NOS$.

EXAMPLE 3

There are charged to a suitable reactor equipped with heating and stirring means, methylmethacrylate (52.5 g, 0.525 m), aniline (48 g, 0.52 m), sodium methoxide (108 g of 25% solution is methanol 0.5 m) and 400 ml of toluene. The mixture is distilled by heating over a period of about 3 hours while the pot temperature incrementally increases to a final pot temperature of 112° C. (vapor temp. 104° C.). During this period, make-up toluene is charged (250 ml total). The residue is cooled, filtered, washed with toluene and dried. N-phenyl-N-sodium-methacrylamide (52 g) is recovered.

To a slurry of N-phenyl-N-sodium-methacrylamide (37 g, 0.2 m) and 200 ml of heptane, there is added at 4°–5° C. over a 40 minute period a heptane solution of cyclohexane sulfenyl chloride (0.2 m). The sodium chloride by-product is removed by filtration. The filtrate is washed with water, washed with dilute sodium carbonate solution, washed again with water, dried and the solvent removed by vacuum distillation. N-Cyclohexylthio-N-phenyl-methacrylamide, a white solid m.p. 54°–55° C., is recovered. Chemical analysis gives 11.46% sulfur compared to 11.64% sulfur calculated for $C_{16}H_{21}NOS$.

The procedure is repeated except a 10 mole % excess of N-phenyl-N-sodium methacrylamide is charged. A higher yield of N-cyclohexylthio-N-phenyl-methacrylamide, m.p. 56°–56.5° C., is obtained.

EXAMPLE 4

To a slurry of N-phenyl-N-sodium methacrylamide, (37 g, 0.2 m) and 200 ml of heptane, there is added at 5°–7° C., over a 40 minute period a heptane solution of 2-propane sulfenyl chloride (0.18 m). By-product salt and product are recovered by filtration. The solids are washed with water to remove by-product salt and then air-dried. The filtrate is vacuum stripped to recover additional product. N-Isopropylthio-N-phenyl-methacrylamide, m.p. 80°–81° C., is recovered. Infrared and NMR spectral analysis and liquid chromographic analysis confirm identification of the product. Chemical analysis, however, gives 11.38% sulfur compared to 13.62% sulfur calculated for $C_{13}H_{17}NOS$ indicating the product decomposes with time.

The invention is illustrated by incorporating inhibitors of the invention into the following natural rubber and synthetic rubber masterbatches.

|  | Masterbatches | |
|---|---|---|
| Smoke Sheets | 100 | — |
| Oil-extended SBR 1712 | — | 89 |
| Cis-4-polybutadiene rubber | — | 35 |
| Carbon Black | 40 | 67 |
| Extender Oil | 10 | 15 |
| Wax | 2 | 2 |
| Zinc Oxide | 5 | 3 |
| Stearic Acid | 1 | 1 |
| N-(1,3 dimethylbutyl)-N'-(phenyl)-p-phenylenediamine | 2 | 2 |
|  | 160 | 214 |

Vulcanizable compositions are prepared by incorporation of accelerator and sulfur. Compositions of the invention are prepared by incorporating inhibitors in the indicated quantities into the vulcanizable compositions. Compositions containing no inhibitors are controls. The results are shown in Tables 1 and 2.

TABLE I

|  | 1 | 2 | 3 | 4 |
|---|---|---|---|---|
| NR Masterbatch | 160 | 160 | 160 | 160 |
| Sulfur | 2.5 | 2.5 | 2.5 | 2.5 |
| N-t-Butyl-2-benzothiazole sulfenamide | 0.5 | 0.5 | 0.5 | 0.5 |
| N-Phenyl-N-phenylthio methacrylamide | — | 0.54 | — | — |
| N-Cyclohexylthio-N-phenyl methacrylamide | — | — | 0.55 | — |
| N-Isopropylthio-N-phenyl methacrylamide | — | — | — | 0.475 |
| Mooney Scorch @135° C. | | | | |
| $t_5$, minutes | 13.8 | 27.4 | 33.4 | 33.5 |
| % increase in scorch delay | — | 99 | 142 | 143 |
| Stress-Strain @153° C. | | | | |
| $M_{300}$, MPa | 6.4 | 6.5 | 6.5 | 6.0 |
| MTS, MPa | 25.7 | 26.7 | 25.6 | 25.2 |
| Elong., % | 690 | 710 | 690 | 700 |

TABLE 2

|  | 1 | 2 | 3 | 4 | 5 |
|---|---|---|---|---|---|
| SBR Masterbatch | 214 | 214 | 214 | 214 | 214 |
| Sulfur | 2 | 2 | 2 | 2 | 2 |
| N-tert-Butyl-2-benzothiazole sulfenamide | 1.2 | 1.2 | 1.2 | 1.2 | 1.2 |
| N,N-Di(phenylthio)-methacrylamide | — | 0.5 | — | — | — |
| N-Phenyl-N-phenylthio-methacrylamide | — | — | 0.5 | — | — |
| N-Cyclohexylthio-N-phenyl-methacrylamide | — | — | — | 0.5 | — |
| N-Isopropylthio-N-phenyl-methacrylamide | — | — | — | — | 0.5 |
| Mooney Scorch @ 135° C. | | | | | |
| $t_5$, minutes | 20.5 | 34.1 | 29.7 | 35.5 | 36.7 |
| % increase in scorch | | | | | |

TABLE 2-continued

|  | 1 | 2 | 3 | 4 | 5 |
|---|---|---|---|---|---|
| delay | — | 66 | 45 | 73 | 79 |
| Stress-Strain @ 153° C. | | | | | |
| $M_{300}$, MPa | 6.6 | 5.8 | 6.3 | 6.1 | 5.8 |
| UTS, MPa | 17.0 | 18.3 | 16.5 | 16.7 | 17.0 |
| Elong., % | 610 | 730 | 610 | 640 | 670 |

The data show that the sulfenyl methacrylamides of the invention effectively inhibit premature vulcanization. The data further indicate that the cycloalkylthio and alkylthio compounds exhibit greater potency than the corresponding phenyl compound. The di-phenylthio compound exhibits higher inhibitor activity than the mono-phenylthio compound.

Although the invention has been illustrated by typical examples, it is not limited thereto. Changes and modifications of the examples of the invention herein chosen for purposes of disclosure can be made which do not consitute departure from the spirit and scope of the invention.

The embodiments of the invention in which an exclusive property or privilege is claimed are defined as follows:

1. A compound of the formula $$CH_2=\underset{CH_3}{\underset{|}{C}}-CO-\underset{R'}{\underset{|}{N}}-S-R$$

in which R is selected from the group consisting of primary or secondary alkyl of 1–20 carbon atoms, benzyl, cycloalkyl of 5–12 carbon atoms, phenyl or mono-, di-, or tri-substituted phenyl wherein the substituents are lower alkyl, lower alkoxy or halo, and R' is phenyl or —SR.

2. The compound of claim 1 in which R' is phenyl.
3. The compound of claim 2 in which R is cycloalkyl of 5–8 carbon atoms.
4. The compound of claim 3 in which R is cyclohexyl.
5. The compound of claim 2 in which R is phenyl.
6. The compound of claim 2 in which R is alkyl of 3–8 carbon atoms.
7. The compound of claim 6 in which R is isopropyl.
8. The compound of claim 1 in which R' is SR.
9. The compound of claim 8 in which R is phenyl.
10. The compound of claim 8 in which R is cyclohexyl.

* * * * *